United States Patent
Hung

(10) Patent No.: US 11,170,560 B2
(45) Date of Patent: Nov. 9, 2021

(54) WEARABLE ASSEMBLY OF SMART HEADSET DISPLAY AND SMART GARMENT

(71) Applicant: Chia-Chieh Hung, Taoyuan (TW)

(72) Inventor: Chia-Chieh Hung, Taoyuan (TW)

( * ) Notice: Subject to any disclaimer, the term of this patent is extended or adjusted under 35 U.S.C. 154(b) by 0 days.

(21) Appl. No.: 17/122,532

(22) Filed: Dec. 15, 2020

(65) Prior Publication Data

US 2021/0192835 A1    Jun. 24, 2021

(30) Foreign Application Priority Data

Dec. 23, 2019  (TW) .................................. 108217110

(51) Int. Cl.
*G06T 15/20* (2011.01)
*G06F 3/01* (2006.01)

(52) U.S. Cl.
CPC .............. *G06T 15/20* (2013.01); *G06F 3/011* (2013.01)

(58) Field of Classification Search
CPC ......... G06T 15/20; G06T 13/40; G06T 15/02; G06T 19/006; G06T 11/00; G06T 13/20; G06F 3/011; G06F 3/016; G06F 3/014
See application file for complete search history.

(56) References Cited

U.S. PATENT DOCUMENTS

2016/0338621 A1* 11/2016 Kanchan ................ A61B 5/002
2020/0371584 A1* 11/2020 Zhao ........................ A63F 13/21

* cited by examiner

*Primary Examiner* — Xilin Guo
(74) *Attorney, Agent, or Firm* — Sinorica, LLC

(57) ABSTRACT

A wearable assembly of smart headset display and a smart garment, which includes: a garment, having a wiring structure with a plurality of sensing nodes for generating a set of sensing data; and a smart headset display device, having at least one lens unit and a control unit, the control unit is used for receiving the set of sensing data, and using said set of sensing data to generate a first image data to drive the at least one lens unit for providing a body model dynamic picture; or using said set of sensing data and a set of reference dynamic picture data to generate a second image data, and the at least one lens unit is driven according to the second image data for simultaneously providing a body model dynamic picture and a reference dynamic picture desired to learn.

10 Claims, 3 Drawing Sheets

WEARABLE ASSEMBLY OF SMART HEADSET DISPLAY AND SMART GARMENT

BACKGROUND OF THE INVENTION

1. Field of the Invention

The present invention relates to a smart garment, especially to a wearable assembly of smart headset display and a smart garment.

2. Description of Related Art

A conventional smart garment is disposed with one or a plurality of sensing units and a micro processing unit on a garment, so that the micro processing unit is able to record the physiological data of a user according to the sensing units.

However, when the user wants to know his/her own physiological condition, the micro processing unit of the conventional smart garment is required to be connected to an external computer device for allowing the physiological data to be outputted to the computer device, thereby allowing the complete physiological data to be displayed on the computer device. In other words, the conventional smart garment is unable to allow the user to timely know his/her physiological condition during an exercising process.

Accordingly, a novel smart garment shall be developed for solving the above-mentioned disadvantages.

SUMMARY OF THE INVENTION

One primary objective of the present invention is to provide a wearable assembly of smart headset display and a smart garment, so that the user is able to watch his/her own body model dynamic picture on a smart headset display device for being aware of his/her actual motions, so as to timely adjust his/her own motions.

Another objective of the present invention is to provide a wearable assembly of smart headset display and a smart garment, so that the user is able to simultaneously watch his/her own body motions and reference motions desired to learn on a smart headset display device no matter what kinds of body motions are desired, thereby increasing the learning efficiency of the user.

Another objective of the present invention is to provide a wearable assembly of smart headset display and a smart garment, so that the user is able to monitor his/her heartbeat or temperature via a smart headset display device, and the user can timely know his/her physiological status while performing a certain exercise, thereby being prevented from putting the user in danger.

Another objective of the present invention is to provide a wearable assembly of smart headset display and a smart garment, so that the user is able to see the information of calories burned by his/her body on a smart headset display device to instantly get informed of an effect of a certain exercise, thereby providing an effective weight losing effect.

Still another objective of the present invention is to provide a wearable assembly of smart headset display and a smart garment, so that the user is able to see the exercising status of each muscle of his/her body via a smart headset display device to instantly get informed of an effect of a certain exercise, thereby increasing the exercising quality and reducing the possibility of being hurt during the exercising.

For achieving said objective, one technical solution provided by the present invention is to provide a wearable assembly of smart headset display and a smart garment, which includes:

a garment, having a wiring structure, wherein the wiring structure has a plurality of sensing nodes for generating a set of sensing data; and a smart headset display device, having at least one lens unit and a control unit, wherein the control unit is used for receiving the set of sensing data, and using said set of sensing data to generate a first image data to drive the at least one lens unit for providing a body model dynamic picture; or using said set of sensing data and a set of reference dynamic picture data to generate a second image data, and the at least one lens unit is driven according to the second image data for simultaneously providing a body model dynamic picture and a reference dynamic picture desired to learn.

For possible embodiment, each of the sensing nodes is used for providing sensing data, and the sensing data can be data of a heartbeat, a temperature, a blood pressure, a position, a speed or an accelerating speed.

For possible embodiment, the plurality of sensing nodes are able to sense body motions of the user wearing the garment, and the control unit is able to process a calories calculation according to the set of sensing data for providing data of calories burned by a body in the body model dynamic picture.

For possible embodiment, the body motion involves at least one part of the following options of one or both upper arms, one or both lower arms, torso, one or both thighs, one or both legs, one or both palms, one or more fingers and one or both soles.

For possible embodiment, the body motion further includes motions of at least one muscle group.

For achieving said objective, another technical solution provided by the present invention is to provide a wearable assembly of smart headset display and a smart garment, which includes:

a garment, having a wiring structure, wherein the wiring structure has a plurality of sensing nodes for generating a set of sensing data; and a smart headset display device, having at least one lens unit and a control unit, wherein the control unit is used for receiving a first image data from a data processing device so as to drive the at least one lens unit according to the first image data for providing a body model dynamic picture; or receiving a second image data from a data processing device so as to drive the at least one lens unit according to the second image data for simultaneously providing a body model dynamic picture and a reference dynamic picture desired to learn, wherein, the data processing device is used for generating the first image data according to the set of sensing data, or generating the second image data according to the set of sensing data and a set reference dynamic picture data.

For possible embodiment, each of the sensing nodes is used for providing sensing data, and the sensing data can be data of a heartbeat, a temperature, a blood pressure, a position, a speed or an accelerating speed.

For possible embodiment, the plurality of sensing nodes are able to sense body motions of the user wearing the garment, and the control unit is able to process a calories calculation according to the set of sensing data for providing data of calories burned by a body in the body model dynamic picture.

For possible embodiment, the body motion involves at least one part of the following options of one or both upper arms, one or both lower arms, torso, one or both thighs, one or both legs, one or both palms, one or more fingers and one or both soles.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
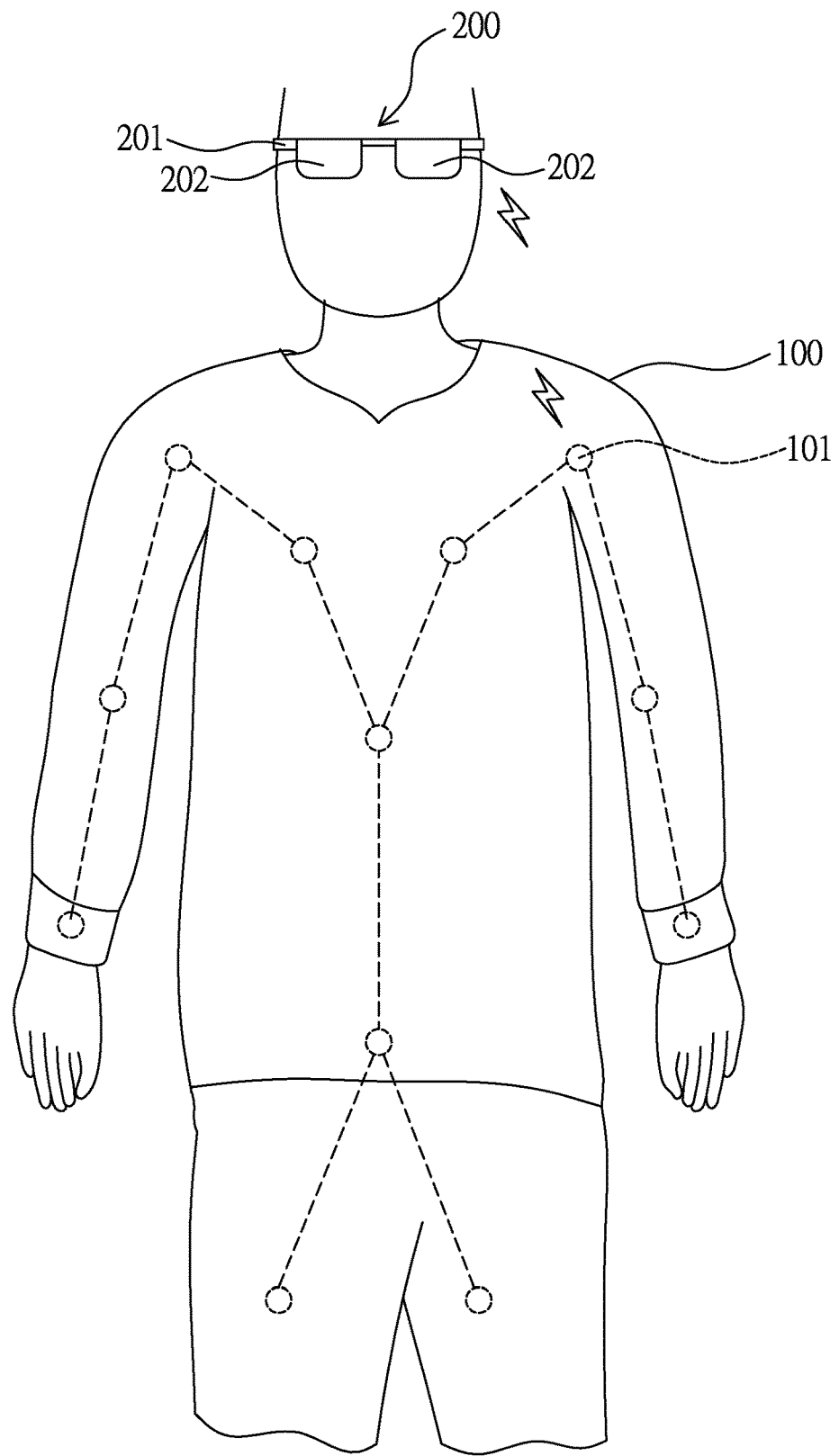
FIG. 1 is a schematic view illustrating a wearable assembly of smart headset display and a smart garment according to one embodiment of the present invention.

Please refer to FIG. 1, which is schematic view illustrating a wearable assembly of smart headset display and a smart garment according to one embodiment of the present invention.

As shown in FIG. 1, the wearable assembly of the smart headset display and the smart garment including a garment 100 and a smart headset display device 200. Wherein, the garment 100 has a wiring structure, the wiring structure has a plurality of sensing nodes 101 for generating a set of sensing data; the smart headset display device 200 has a frame 201, at least one lens unit 202 and a control unit (not shown in figures); the control unit can be integrated in the frame 201 or the lens unit 202 and used for receiving the set of sensing data, and combining the set of sensing data and a body model data for generating a first image data, and the at least one lens unit 202 is driven according to the first image data for providing a body model dynamic picture; or generating a second image data according to the set of sensing data and a set of reference dynamic picture data, and the at least one lens unit 202 is driven according to the second image data for simultaneously providing a body model dynamic picture and a reference dynamic picture desired to learn. Moreover, the control unit is able to set and adjust a displaying speed of the desired reference dynamic picture according to a desired displaying speed for allowing a user to learn and follow, and the control unit may have a pressing-type input unit or a voice-controlled input unit for allowing the user to input a setting of the desired displaying speed. Because the pressing-type input unit and the voice-controlled input unit are known as priors, therefore no further illustration is provided.

Moreover, the smart headset display device 200 is able to communicate with the garment 100 with a wired or a wireless means for receiving the set of sensing data.

Moreover, each of the sensing nodes 101 is used for providing sensing data, and the sensing data can be a heartbeat, a temperature, a blood pressure, a position, a speed or an accelerating speed.

Figure 2:
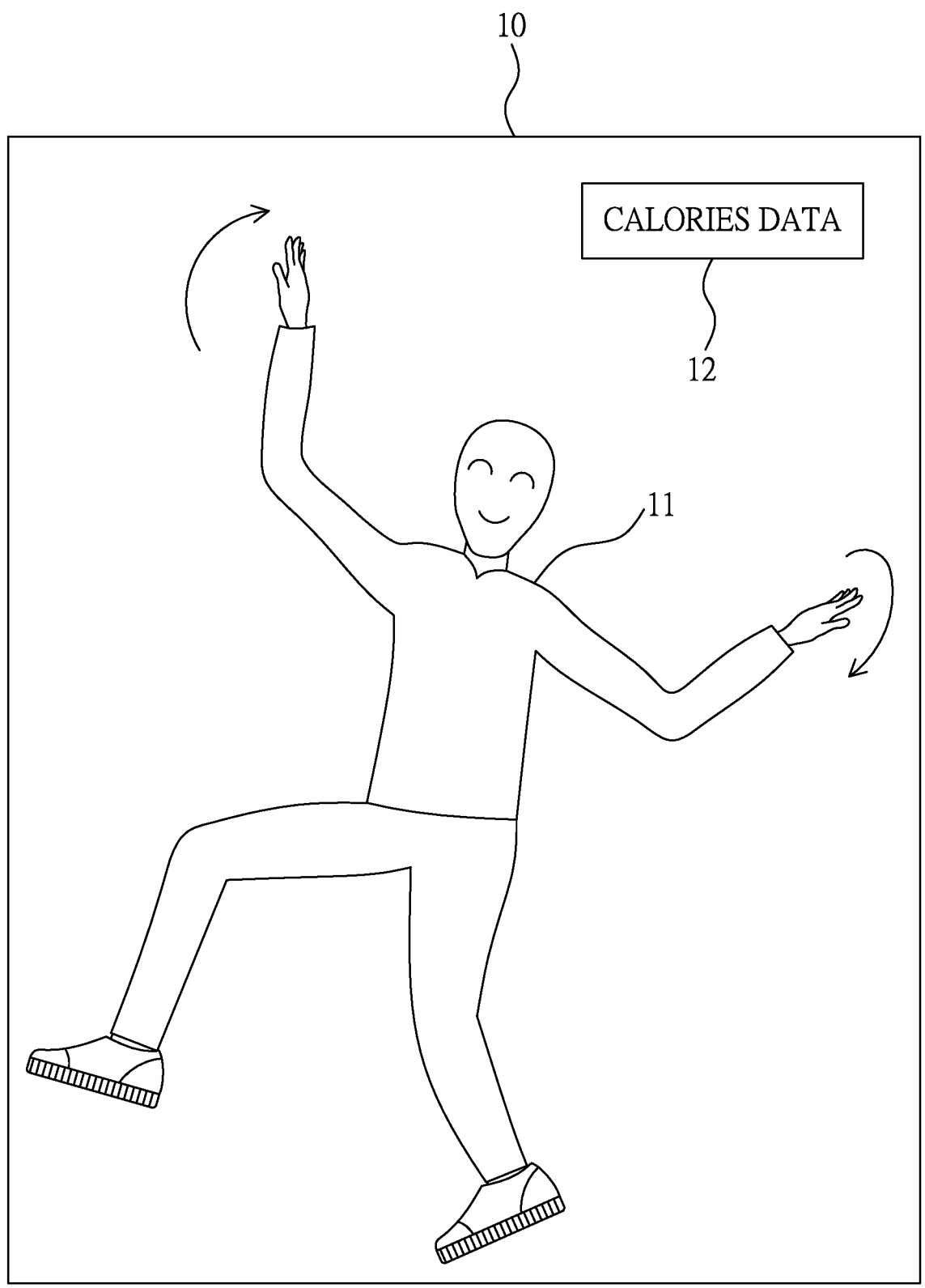
FIG. 2 is a schematic view illustrating the data of calories burned by the body being provided in the body model dynamic picture according to the present invention.

Moreover, the plurality of sensing nodes 101 are able to sense body motions of the user wearing the garment 100, and the control unit is able to process a calories calculation according to the set of sensing data for providing data of calories burned by the body in the body model dynamic picture. Please refer to FIG. 2, which is a schematic view illustrating the data of calories burned by the body being provided in the body model dynamic picture according to the present invention. As shown in FIG. 2, a body model dynamic picture 10 has a moving body 11 and a calories data 12.

Moreover, the body motion involves at least one part of the following options of one or both upper arms, one or both lower arms, torso, one or both thighs, one or both legs and one or more fingers, and the body motion can further include motions of at least one muscle group.

Moreover, the wearable assembly of the smart headset display and smart garment provided by the present invention can further includes a data processing device for processing the set of sensing data so as to reduce a load of the smart headset display device 200.

Figure 3:
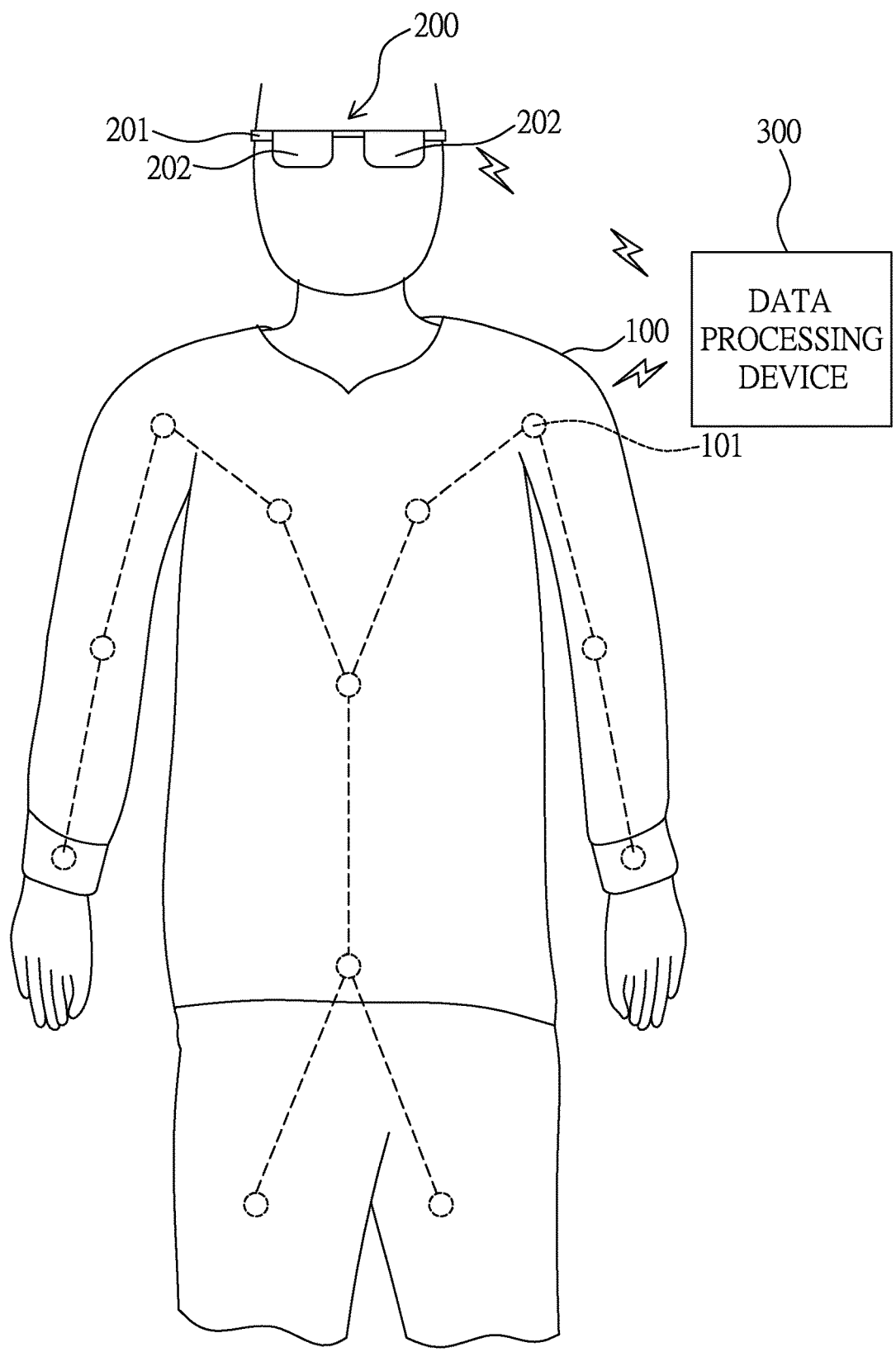
FIG. 3 is a schematic view illustrating the wearable assembly of the smart headset display and the smart garment according to another embodiment of the present invention.

Please refer to FIG. 3, which is schematic view illustrating the wearable assembly of the smart headset display and the smart garment according to another embodiment of the present invention.

As shown in FIG. 3, the wearable assembly of the smart headset display and the smart garment including a garment 100 and a smart headset display device 200 and a data processing device 300. Wherein, the garment 100 has a wiring structure, the wiring structure has a plurality of sensing nodes 101 for generating a set of sensing data; the smart headset display device 200 has a frame 201, at least one lens unit 202 and a control unit (not shown in figures); the control unit can be integrated in the frame 201 or the lens unit 202, and receive a first image data from the data processing device 300 so as to drive the at least one lens unit 202 according to the first image data for providing a body model dynamic picture; or receive a second image data from the data processing device 300 so as to drive the at least one lens unit 202 according to the second image data for simultaneously providing a body model dynamic picture and a reference dynamic picture desired to learn. Wherein, the data processing device 300 is used for generating the first image data according to the set of sensing data, or generating the second image data according to the set of sensing data and a set of reference dynamic picture data.

Moreover, the data processing device 300 is able to communicate with the garment 100 or the smart headset display device 200 with a wired or a wireless means for receiving the set of sensing data from the garment 100 and sending the image data to the smart headset display device 200.

Moreover, each of the sensing nodes 101 is used for providing sensing data, and the sensing data can be a heartbeat, a temperature, a blood pressure, a position, a speed or an accelerating speed.

Moreover, the plurality of sensing nodes 101 are able to sense body motions of the user wearing the garment 100, and the control unit is able to process a calories calculation according to the set of sensing data for providing data of calories burned by the body in the body model dynamic picture, which is disclosed in FIG. 2.

Moreover, the body motion involves at least one part of the following options of one or both upper arms, one or both lower arms, torso, one or both thighs, one or both legs and one or more fingers, and the body motion can further involve motions of at least one muscle group.

In addition, the smart headset display device can further present a virtual scene for a user wearing said garment to reference or interact with, and the virtual scene can include at least one virtual object.

Based on what has been disclosed above, advantages achieved by the present invention are as follows:

1. With the wearable assembly of the smart headset display and the smart garment provided by the present invention, the user is able to watch his/her own body dynamic picture on the smart headset display device for being aware of his/her actual motions, so as to timely adjust his/her own motions.
2. With the wearable assembly of the smart headset display and the smart garment provided by the present invention, the user is able to simultaneously watch his/her own body motions and the reference motions desired to learn on the smart headset display device, so that a problem of not being able to see his/her own motions and the reference motions desired to learn when he/she is turning away from a fixed display screen or a mirror can be solved, thereby increasing the learning efficiency of the user.
3. With the wearable assembly of the smart headset display and the smart garment provided by the present invention, the user is able to monitor his/her heartbeat or temperature via the smart headset display device, so that the user can timely know his/her physiological status while performing a certain exercise, thereby preventing from putting the user in danger.
4. With the wearable assembly of the smart headset display and the smart garment provided by the present invention, the user is able to see the information of the calories burned by his/her body on the smart headset display device to instantly get informed of an effect of a certain exercise, thereby providing an effective weight losing effect.
5. With the wearable assembly of the smart headset display and the smart garment provided by the present invention, the user is able to see the exercising status of each muscle of his/her body via the smart headset display device to instantly get informed of an effect of a certain exercise, thereby increasing the exercising quality and reducing the possibility of being hurt during the exercising.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A wearable assembly of smart headset display and a smart garment, including:
    a garment, having a wiring structure, wherein said wiring structure has a plurality of sensing nodes for generating a set of sensing data; and
    a smart headset display device, having at least one lens unit and a control unit, wherein said control unit is used for receiving said set of sensing data, and using said set of sensing data and a set of reference dynamic picture data to generate an image data, and said at least one lens unit is driven according to said image data for simultaneously providing a body model dynamic picture and a reference dynamic picture desired to learn,
    wherein each of said sensing nodes is used for providing sensing data to said control unit, and said sensing data includes motion data and physiological data, motion data being selected from a group consisting of position data, speed data and accelerating speed data, and physiological data being selected from a group consisting of heartbeat data, temperature data and blood pressure data.

2. The wearable assembly of the smart headset display and the smart garment as claimed in claim 1, wherein said plurality of sensing nodes are able to sense body motions of a user wearing said garment, and said control unit is able to process a calories calculation according to said set of sensing data for providing data of calories burned by a body in said body model dynamic picture.

3. The wearable assembly of the smart headset display and the smart garment as claimed in claim 2, wherein said body motion is selected from motions of at least one body part group consisting of one or both upper arms, one or both lower arms, torso, one or both thighs, one or both legs, one or both palms, one or more fingers and one or both soles.

4. The wearable assembly of the smart headset display and the smart garment as claimed in claim 2, wherein said body motions include motions of at least one muscle group.

5. A wearable assembly of smart headset display and a smart garment, including:
    a garment, having a wiring structure, wherein said wiring structure has a plurality of sensing nodes for generating a set of sensing data; and
    a smart headset display device, having at least one lens unit and a control unit, wherein said control unit is used for receiving an image data from a data processing device so as to drive said at least one lens unit according to said image data for simultaneously providing a body model dynamic picture and a reference dynamic picture desired to learn, wherein, said data processing device is used for generating said image data according to said set of sensing data and a set reference dynamic picture data,
    wherein each of said sensing nodes is used for providing sensing data to said control unit, and said sensing data includes motion data and physiological data, motion data being selected from a group consisting of position data, speed data and accelerating speed data, and physiological data being selected from a group consisting of heartbeat data, temperature data and blood pressure data.

6. The wearable assembly of the smart headset display and the smart garment as claimed in claim 5, wherein said plurality of sensing nodes are able to sense body motions of a user wearing said garment, and said control unit is able to process a calories calculation according to said set of sensing data for providing data of calories burned by a body in said body model dynamic picture.

7. The wearable assembly of the smart headset display and the smart garment as claimed in claim 6, wherein said body motion is selected from motions of at least one body part group consisting of one or both upper arms, one or both lower arms, torso, one or both thighs, one or both legs, one or both palms, one or more fingers and one or both soles.

8. The wearable assembly of the smart headset display and the smart garment as claimed in claim 6, wherein said body motions include motions of at least one muscle group.

9. The wearable assembly of the smart headset display and the smart garment as claimed in claim 5, wherein said smart headset display device is capable of presenting a virtual scene for a user wearing said garment to reference or interact with.

10. The wearable assembly of the smart headset display and the smart garment as claimed in claim 9, wherein said virtual scene including at least one virtual object.

\* \* \* \* \*